United States Patent
Hwang et al.

(10) Patent No.: US 11,288,840 B2
(45) Date of Patent: Mar. 29, 2022

(54) ARTIFICIAL INTELLIGENCE APPARATUS FOR ESTIMATING POSE OF HEAD AND METHOD FOR THE SAME

(71) Applicant: LG ELECTRONICS INC., Seoul (KR)

(72) Inventors: Taeju Hwang, Seoul (KR); Beopjung Kim, Seoul (KR); Namjoon Kim, Seoul (KR); Yubin Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 16/866,481

(22) Filed: May 4, 2020

(65) Prior Publication Data

US 2021/0217195 A1   Jul. 15, 2021

(30) Foreign Application Priority Data

Jan. 14, 2020  (KR) .................. 10-2020-0004904

(51) Int. Cl.
| | |
|---|---|
| *G06T 7/00* | (2017.01) |
| *G06T 7/73* | (2017.01) |
| *G06K 9/00* | (2022.01) |
| *G06N 3/08* | (2006.01) |
| *G06K 9/62* | (2022.01) |

(52) U.S. Cl.
CPC ............ *G06T 7/74* (2017.01); *G06K 9/00241* (2013.01); *G06K 9/00255* (2013.01); *G06K 9/6256* (2013.01); *G06N 3/08* (2013.01)

(58) Field of Classification Search
CPC .. G06T 7/74; G06K 9/00241; G06K 9/00255; G06K 9/6256; G06N 3/08
See application file for complete search history.

(56) References Cited

U.S. PATENT DOCUMENTS

| | | | |
|---|---|---|---|
| 10,417,810 B2 * | 9/2019 | Lodato | G06T 15/04 |
| 2016/0202756 A1 * | 7/2016 | Wu | G06F 3/013 |
| | | | 382/103 |
| 2019/0026958 A1 * | 1/2019 | Gausebeck | G06T 19/20 |

FOREIGN PATENT DOCUMENTS

| | | | | |
|---|---|---|---|---|
| CN | 105760809 A | * | 7/2016 | |
| CN | 107341827 A | * | 11/2017 | G06T 19/20 |

* cited by examiner

*Primary Examiner* — Ping Y Hsieh
*Assistant Examiner* — Xiao Liu
(74) *Attorney, Agent, or Firm* — Lee Hong Degerman Kang & Waimey

(57) ABSTRACT

Disclosed is an artificial intelligence (AI) apparatus including a two-dimensional (2D) image sensor configured to acquire a 2D image of a head of a person, a three-dimensional (3D) image sensor configured to acquire 3D head pose information of the head, and a processor configured to match the 2D image with the 3D head pose information, to extract 3D head pose information for determining a rotation direction of the head from the 3D head pose information, to extract a 2D image matched with the extracted 3D head pose information, to acquire 3D relative coordinates as a reference for correcting the 3D head pose information based on 2D coordinates of a predetermined landmark point of the extracted 2D image, and to acquire the corrected 3D head pose information of the predetermined landmark point of each 2D image by correcting the 3D head pose information based on the 3D relative coordinates.

16 Claims, 9 Drawing Sheets

| Sensor type | Frame # | Whether light is emitted | Sensor type | Frame # | Whether light is emitted |
|---|---|---|---|---|---|
| 2D | 10 | Off | 3D | 22 | Off |
| 2D | 11 | On | 3D | 23 | On |
| 2D | 12 | On | 3D | 24 | On |
| 2D | 13 | Off | 3D | 25 | Off |

FIG. 11

| Sensor type | Frame # | Whether light is emitted | Sensor type | Frame # | Whether light is emitted |
|---|---|---|---|---|---|
| 2D | 10 | Off | 3D | 22 | Off |
| 2D | 11 | On | 3D | 23 | On |
| 2D | 11 | On | 3D | 24 | On |
| 2D | 11 | On | 3D | 25 | On |
| 2D | 12 | Off | 3D | 26 | Off |
| 2D | 12 | Off | 3D | 27 | Off |
| 2D | 12 | Off | 3D | 28 | Off |

ARTIFICIAL INTELLIGENCE APPARATUS FOR ESTIMATING POSE OF HEAD AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2020-0004904, filed on Jan. 14, 2020, the contents of which are hereby incorporated by reference herein in its entirety.

FIELD

The present disclosure relates to an artificial intelligence (AI) apparatus for estimating a pose of a head and a method thereof, and more particularly, to an AI apparatus for estimating a three-dimensional (3D) pose of a head from a two-dimensional (2D) image and a method of the AI apparatus.

BACKGROUND

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, technology for recognizing and learning a surrounding situation using artificial intelligence and providing information desired by a user in a desired form or performing a function or operation desired by the user is actively being studied.

An electronic device for providing such operations and functions may be referred to as an artificial intelligence device.

There have been increasing attempts to provide various services based on a person pose inferred from a pose of a person.

However, there is a problem in that an expensive three-dimensional (3D) camera needs to be used to recognize a pose of a person.

Thus, there has been an increasing need for a function of recognizing a pose of a person using a 2D camera.

SUMMARY

The present disclosure is provided to overcome the aforementioned problems and other problems.

An object of the present disclosure is to provide an artificial intelligence (AI) apparatus and a method for the same for inferring three-dimensional (3D) head pose information from a two-dimensional (2D) image of a head of a person.

Another object of the present disclosure is to provide an artificial intelligence (AI) apparatus and a method for the same for training a 3D head pose reasoning model for inferring 3D head pose information from a 2D image.

Another object of the present disclosure is to provide an artificial intelligence (AI) apparatus and a method for the same for training a 3D head pose reasoning model based on accurate learning data by correcting learning data for training a 3D head pose reasoning model.

The present disclosure provides an artificial intelligence (AI) apparatus including a two-dimensional (2D) image sensor configured to acquire a 2D image of a head of a person, a three-dimensional (3D) image sensor configured to acquire 3D head pose information of the head, and a processor configured to match the 2D image with the 3D head pose information, to extract 3D head pose information for determining a rotation direction of the head from the 3D head pose information, to extract a 2D image matched with the extracted 3D head pose information, to acquire 3D relative coordinates as a reference for correcting the 3D head pose information based on 2D coordinates of a predetermined landmark point of the extracted 2D image, and to acquire the corrected 3D head pose information of the predetermined landmark point of each 2D image by correcting the 3D head pose information based on the 3D relative coordinates.

The present disclosure provides a method of estimating a head pose, the method including acquiring a two-dimensional (2D) image of a head of a person through a 2D image sensor, acquiring three-dimensional (3D) head pose information of the head through a 3D image sensor, matching the 2D image with the 3D head pose information, extracting 3D head pose information for determining a rotation direction of the head from the 3D head pose information, extracting a 2D image matched with the extracted 3D head pose information, acquiring 3D relative coordinates as a reference for correcting the 3D head pose information based on 2D coordinates of a predetermined landmark point of the extracted 2D image, and acquiring the corrected 3D head pose information of the predetermined landmark point of each 2D image by correcting the 3D head pose information based on the 3D relative coordinates.

BRIEF DESCRIPTION OF THE DRAWINGS

FIG. 9 is a diagram for explaining a method of acquiring a 2D image and 3D head pose information according to an embodiment of the present disclosure.

FIGS. 10 and 11 are diagrams for explaining a method of matching a 2D image with 3D head pose information according to an embodiment of the present disclosure.

DETAILED DESCRIPTION

Figure 1:
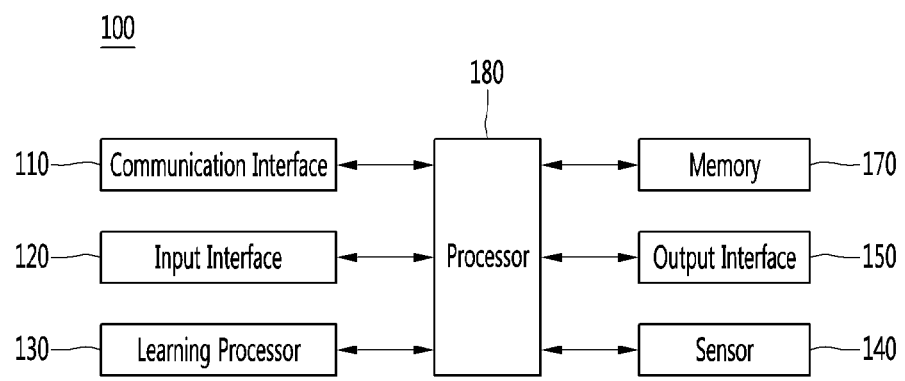
FIG. 1 illustrates an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the present disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
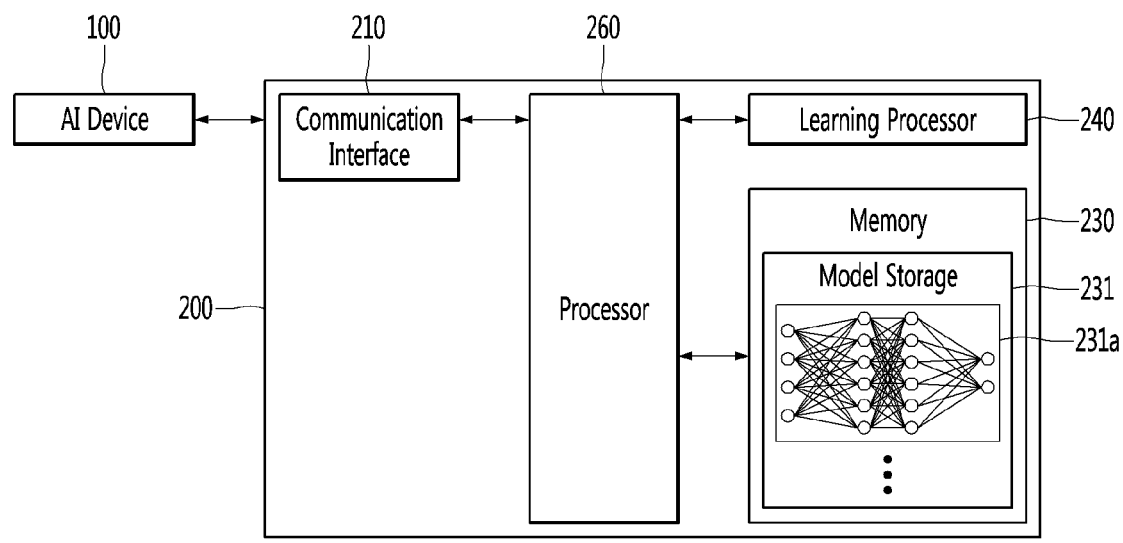
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
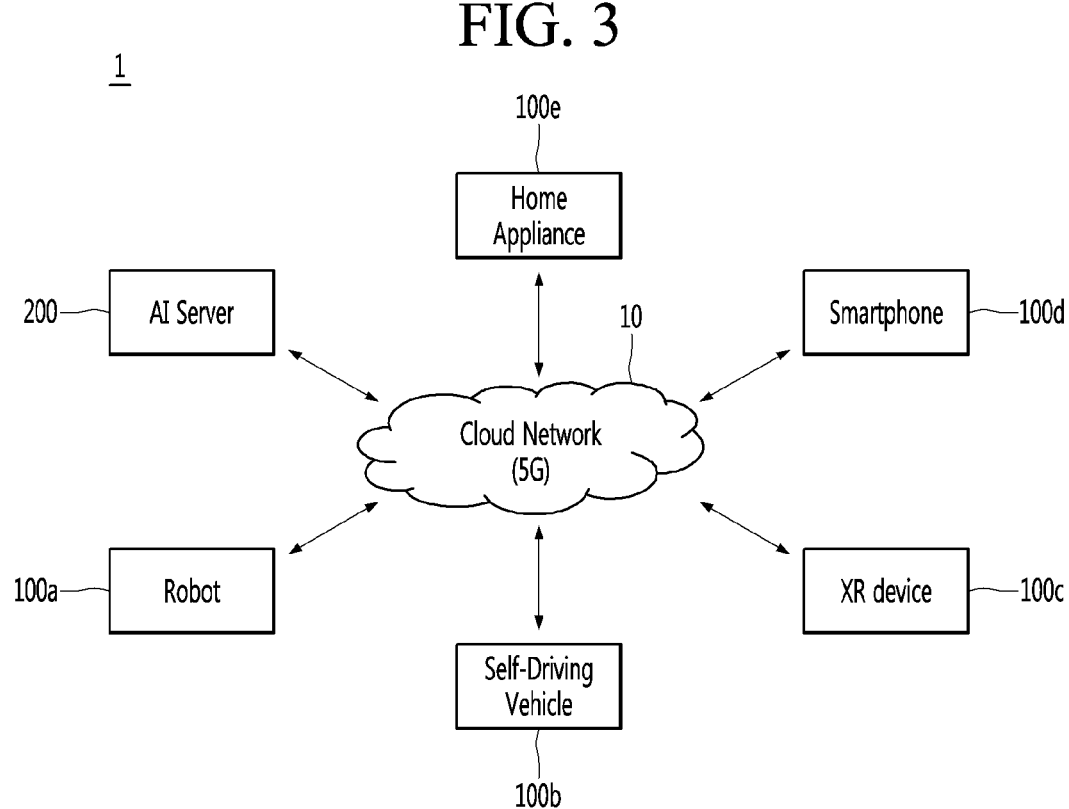
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driver based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driver such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driver based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
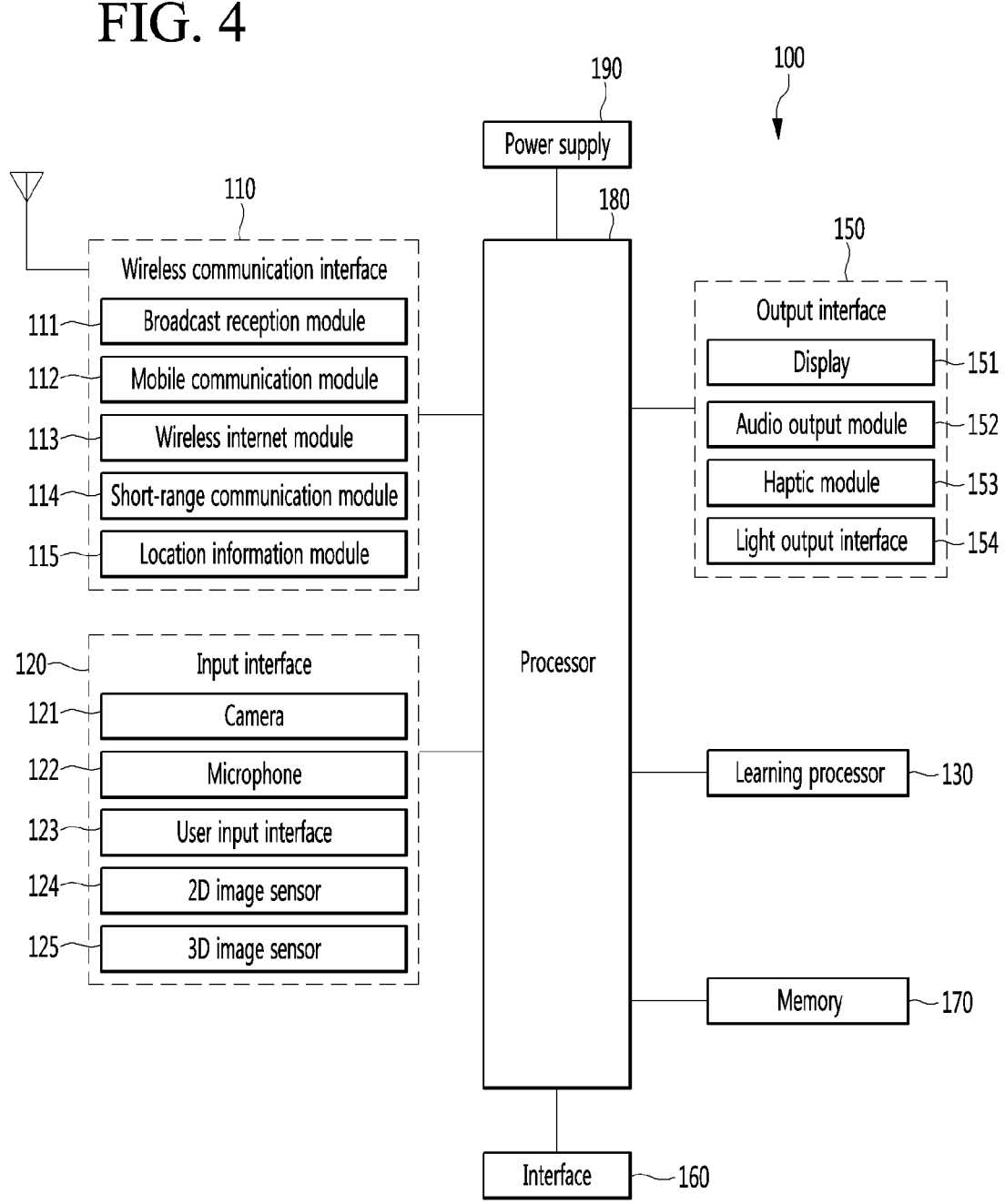
FIG. 4 is a block diagram illustrating an artificial intelligence apparatus according to the present disclosure.

FIG. 4 is a block diagram illustrating an artificial intelligence device according to the present disclosure.

A description overlapping FIG. 1 will be omitted.

The communication interface 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input interface 120 may include a camera 121 for receiving a video signal, a microphone 122 for receiving an audio signal, and a user input interface 123 for receiving information from a user.

The camera 121 may process image frames of still images or moving images obtained by image sensors in a video call more or an image capture mode. The processed image frames can be displayed on the display 151 or stored in memory 170.

A 2D image sensor 124 may acquire a 2D image of a predetermined object. The 2D image sensor 124 may include a 2D image camera, and the 2D image camera may process a frame of the 2D image acquired by a 2D image sensor. The processed frame may be displayed on a display 151 or may be stored in a memory 170.

A 3D image sensor 125 may acquire 3D coordinate information, 3D rotation information, or an image of the predetermined object. The 3D image camera may process the 3D coordinate information, the 3D rotation information, and the image of the predetermined object, acquired by the 3D image sensor 125. The processed 3D coordinate information, 3D rotation information, and image may be displayed on the display 151 or may be stored in the memory 170.

Each of the 2D image sensor 124 and the 3D image sensor 125 may be controlled by each of the plurality of processors 180.

The microphone 122 processes an external acoustic signal into electrical audio data. The processed audio data may be variously used according to function (application program) executed in the artificial intelligence device 100. Meanwhile, the microphone 122 may include various noise removal algorithms to remove noise generated in the process of receiving the external acoustic signal.

The user input interface 123 receives information from a user. When information is received through the user input interface 123, the processor 180 may control operation of the artificial intelligence device 100 in correspondence with the input information.

The user input interface 123 may include one or more of a mechanical input element (for example, a mechanical key, a button located on a front and/or rear surface or a side surface of the artificial intelligence device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The output interface 150 is typically configured to output various types of information, such as audio, video, tactile output, and the like. The output interface 150 may include a display 151, an audio output module 152, a haptic module 153, and a light output interface 154.

The display 151 is generally configured to display (output) information processed in the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence device 100 and a user, as well as function as the user input interface 123 which provides an input interface between the artificial intelligence device 100 and the user.

The audio output module 152 is generally configured to output audio data received from the wireless communication interface 110 or stored in the memory 170 in a call signal reception mode, a call mode, a record mode, a speech recognition mode, a broadcast reception mode, and the like. The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output interface 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

An interface 160 serves as an interface with external devices to be connected with the artificial intelligence device 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence device 100 may perform appropriate control related to the connected external device in correspondence with connection of the external device to the interface 160.

The identification module may be a chip that stores a variety of information for granting use authority of the artificial intelligence device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence device 100 via the interface 160.

The power supply 190 receives external power or internal power and supplies the appropriate power required to operate respective components included in the artificial intelligence device 100, under control of the processor 180. The power supply 190 may include a battery, and the battery may be a built-in or rechargeable battery.

Meanwhile, as described above, the processor 180 controls operation related to the application program and overall operation of the artificial intelligence device 100. For example, the processor 180 may execute or release a lock function for limiting input of a control command of the user to applications when the state of the mobile artificial intelligence device satisfies a set condition.

Figure 5:
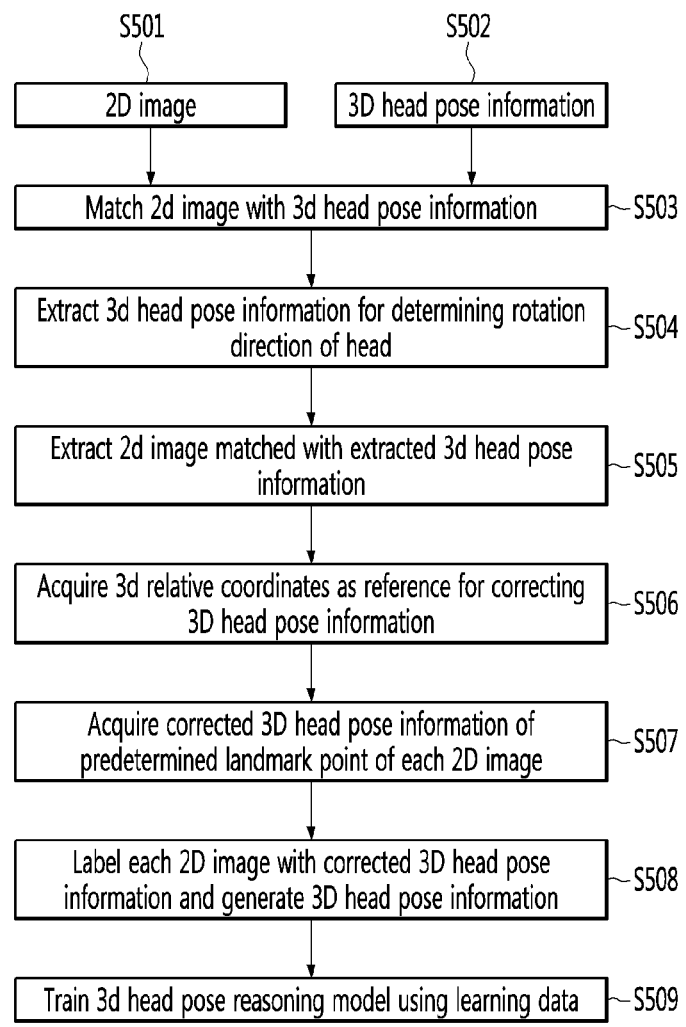
FIG. 5 is a flowchart of a method of acquiring 3D head pose information according to an embodiment of the present disclosure.

FIG. 5 is a flowchart of a method of acquiring 3D head pose information according to an embodiment of the present disclosure.

The 2D image sensor 124 may acquire a 2D image of a head of a person (S501).

The 2D image sensor 124 may acquire a 2D image of a predetermined object. The 2D image sensor 124 may be included in a 2D image camera, and the 2D image camera may process a frame of the 2D image acquired by the 2D image sensor.

The processor 180 may acquire a 2D image of a head of a person through the 2D image sensor 124.

The processor 180 may detect a landmark point of the head from the 2D image.

The landmark point of the head may be a feature point for recognizing a head position and a head direction. For example, the landmark point of the head may be a point in which possibility that a change occurs depending on a face expression is low, such as edges of two eyes, the philtrum, or the tip of the nose.

The processor 180 may also detect the landmark of the head from the 2D image using an artificial neural network model for outputting the landmark point of the head from an image of the head of the person.

Figure 6:
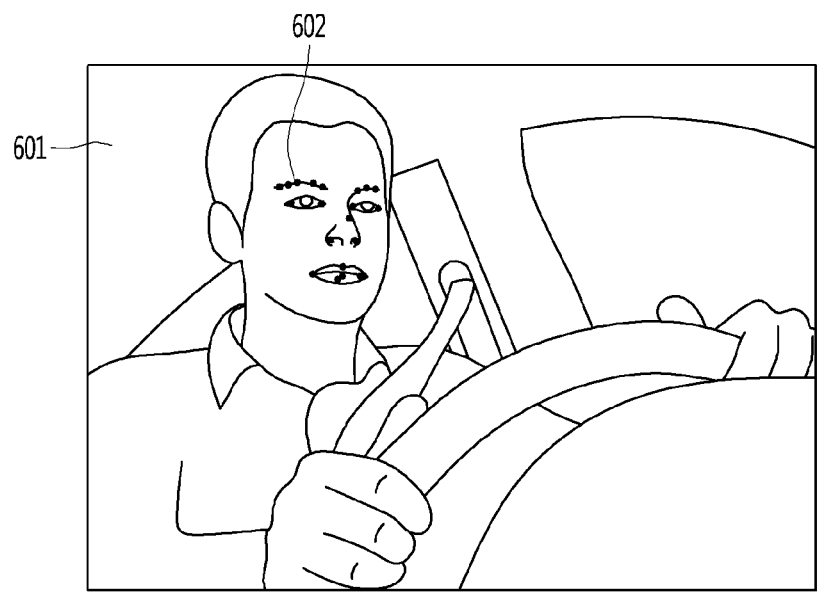
FIG. 6 is a diagram illustrating a 2D image according to an embodiment of the present disclosure.

Referring to FIG. 6, the 2D image sensor 124 may acquire a 2D image 601 of the head of the person. The processor 180 may detect at least one landmark point 602 from the 2D image 601. The processor 180 may map the 2D image 601 to the at least one landmark point 602 and may store the result in the memory 170.

The processor 180 may display the 2D image acquired through the 2D image sensor 124, through the display 151, and may receive coordinates corresponding to the landmark point of the head of the 2D image from a user.

Figure 7:
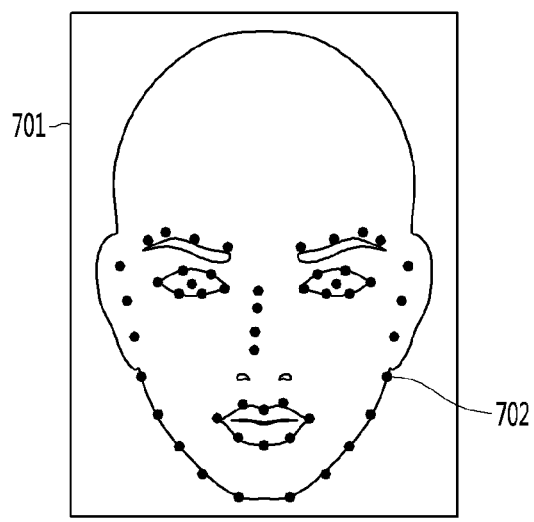
FIG. 7 is a diagram illustrating a landmark point of a 2D image according to an embodiment of the present disclosure.

Referring to FIG. 7, the processor 180 may receive coordinates corresponding to at least one landmark point 702 in a 2D image 701. The processor 180 may match the 2D image with the received landmark point and may store the result in the memory 170.

The processor 180 may display the 2D image acquired through the 2D image sensor 124 and the detected landmark point of the head through the display 151 and may also provide an interface for correcting or editing the landmark point of the head.

The 3D image sensor 125 may acquire 3D head pose information of the head of the person (S502).

The 3D image sensor 125 may acquire 3D coordinate information, 3D rotation information, or an image of a predetermined object. The 3D image camera may process the 3D coordinate information, the 3D rotation information, and the image of the predetermined object, acquired by the 3D image sensor 125.

The 3D head pose information may include head position information including a 3D coordinate value of the head.

The head position information may include a 3D coordinate value of at least one feature point of the head. In this case, the 3D coordinate value may be a 3D coordinate value in a coordinate system based on the 3D image sensor. That is, the 3D head pose information may include a 3D coordinate value of a coordinate system of the 3D image sensor.

At least one of feature point of the head in the head position information may be set to be the same as at least one landmark point of a 2D image. For example, when the landmark point of the 2D image is the philtrum of the head, a feature point in the 3D position information may also be the philtrum of the head.

The 3D head pose information may include head rotation information including a roll value, a pitch value, and a yaw value of the head.

The head rotation information may include a roll value, a pitch value, and a yaw value of each of at least one feature point of the head.

Figure 8:
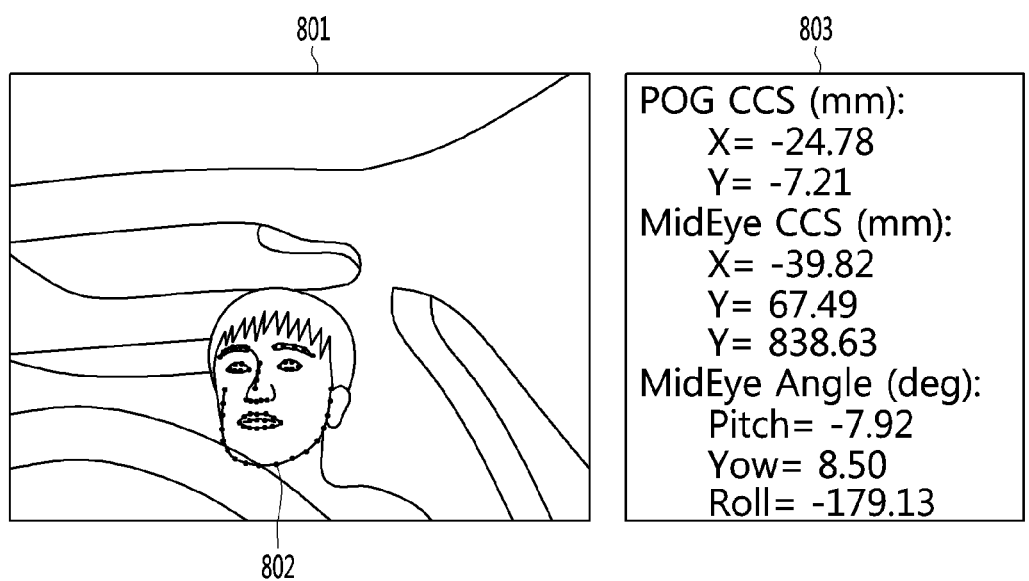
FIG. 8 is a diagram illustrating 3D head pose information according to an embodiment of the present disclosure.

Referring to FIG. 8, the 3D image sensor 125 may acquire 3D head pose information 803 including a 3D coordinate value of a predetermined point 802 of the head and a roll value, a pitch value, and a yaw value of a predetermined point of the head. The 3D image sensor 125 may also acquire an image 801 of the head of the person.

The processor 180 may store the 3D head pose information and an image acquired through a 3D image sensor 135, in the memory 170.

Figures 9, 10:
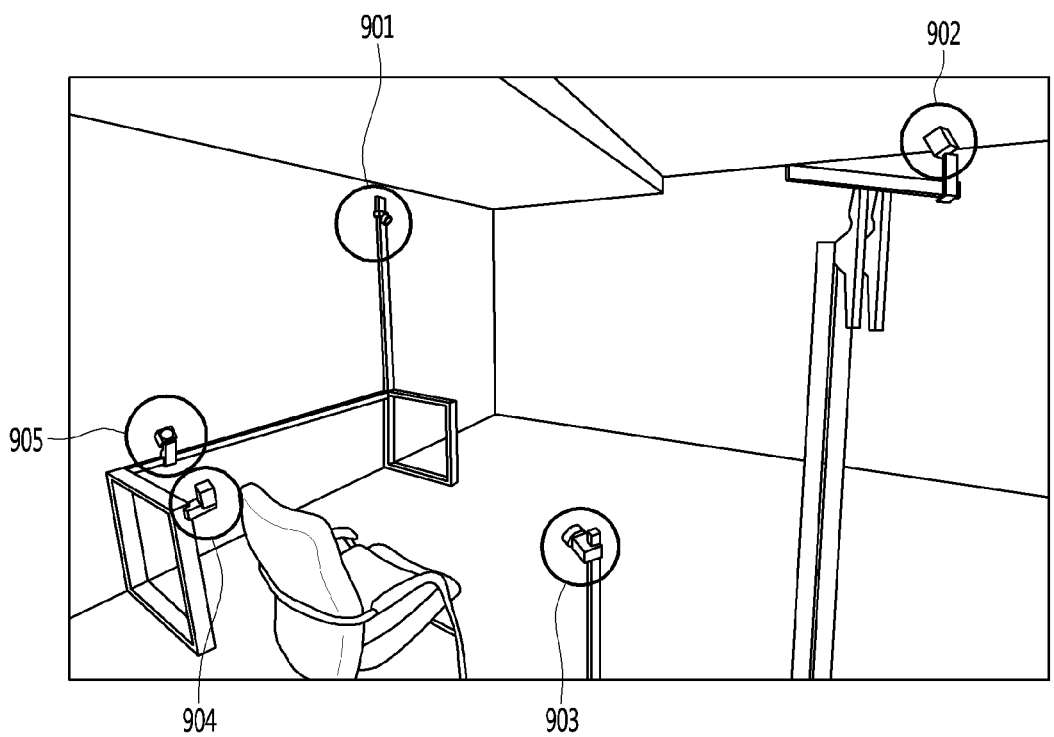

FIG. 9 is a diagram for explaining a method of acquiring a 2D image and 3D head pose information according to an embodiment of the present disclosure.

The AI device 100 may include a plurality of cameras 901, 902, 903, 904, and 905 in order to acquire a 2D image and 3D head pose information of the head of the person. The plurality of cameras may include at least one 2D image camera including a 2D image sensor and at least one 3D camera including a 3D image sensor.

The 2D image sensor 124 and the 3D image sensor 125 may be controlled by each of the plurality of processors 180.

Thus, the processor 180 may separately acquire the 2D image and the 3D head pose information. In this case, the separately acquired 2D image and 3D head pose information may be matched with each other.

There may be error between photography start times of the 2D image sensor 124 and the 3D image sensor 125, and thus it may be required to synchronize the photography start time with each other.

Thus, the processor 180 may match a frame of the 2D image acquired from the 2D image sensor 124 with each frame of the 3D head pose information acquired from the 3D image sensor 125 and may generate a set of the 2D image and the 3D head pose information of the head of the same person at the same time. Thus, later, the learning processor 130 may use the set of the 2D image and the 3D head pose information of the head of the same person at the same time as learning data for training an artificial neural network model for outputting 3D head pose information from the 2D image.

The processor 180 may match the 2D image with the 3D head pose information (S503)

The processor 180 may match the 2D image with 3D head pose information corresponding to the 2D image and may acquire learning data required to train the artificial neural network model.

The processor 180 may match the 2D image acquired from the 2D image sensor 124 with the 3D head pose information acquired from the 3D image sensor 125. Thus, the processor 180 may generate the set of the 2D image and the 3D head pose information of the head of the same person at the same time.

An error may also occur in an operation start time depending on an operation reaction speed or operation load of a sensor even when the 2D image sensor 124 and the 3D image sensor 125 are simultaneously operated.

Thus, times for acquiring the 2D image and the 3D head pose information may be differently stored, thereby degrading the accuracy of learning data.

Thus, the AI device 100 may further include an illuminant that emits light at a preset period. The illuminant may be included in the light output interface 154. An on/off state of the illuminant may be changed at a period of 0.5 seconds.

The 2D image sensor 124 and the 3D image sensor 125 may acquire an image of a light source that emits light at a preset period from the illuminant.

Thus, the processor 180 may synchronize the 2D image and the 3D head pose information with each other based on an image of a light source that emits light at a preset period.

The processor 180 may match frame information of the 2D image with frame information of the 3D head pose information based on the image of the light source that emits light at a preset period.

Referring to FIG. 10, the processor 180 may match respective frame numbers of the 2D image and the 3D head pose information with the 2D image and an image corresponding to the 3D head pose information based on whether a light source that emits light at a preset period is present.

For example, when luminescence in frames #11 and #12 of the 2D image sensor is an on-state, frames #23 and #24 of 3D head pose information, in which luminescence is an on-state, may be matched with each other.

Thus, even if there is a slight difference in an operation start time between the 2D image sensor and the 3D image sensor, the processor 180 may perform correction and may generate the set of the 2D image and the 3D head pose information of the head of the same person at the same time.

The 2D image sensor 124 and the 3D image sensor 125 may have different frame rates. Thus, the number of frames acquired per second by the 2D image sensor 124 may be lower or higher than the number of frames acquired per second by the 3D image sensor 125.

When the number of frames acquired per second by the 2D image sensor 124 is lower than the number of frames acquired per second by the 3D image sensor 125, the processor 180 may match a plurality of frames of the 3D head pose information with at least one frame of the 2D image.

When the number of frames acquired per second by the 2D image sensor 124 is higher than the number of frames acquired per second by the 3D image sensor 125, the processor 180 may match a plurality of frames of the 2D image with at least one frame of the 3D head pose information.

Referring to FIG. 11, when the number of frames acquired per second by the 2D image sensor 124 is lower than the number of frames acquired per second by the 3D image sensor 125, an image of a light source that is turned on in the same way may be included in a frame #11, and an image corresponding to 3D head pose information may be included in frames #23, #24, and #25.

Thus, the processor 180 may match frame #11 of the 2D image with frames #23, #24, and #25 of the 3D head pose information.

The processor 180 may synchronize a timestamp of the 2D image sensor with a timestamp of the 3D image sensor.

For example, the processor 180 may synchronize the timestamp of the 2D image sensor with the timestamp of the 3D image sensor using a time synchronization protocol (network Time protocol (NTP)) through a first processor for controlling the 2D image sensor and a second processor for controlling the 3D image sensor.

The processor 180 may store a timestamp when a photography start signal is input from the 2D image sensor as metadata of the 2D image. Thus, a time at which photography is started and the 2D image may be acquired from the 2D image sensor to remove an error due to a time difference stored in the memory 170.

The processor 180 may match 3D head pose information having the same timestamp as a timestamp included in metadata of the 2D image with the 2D image.

Thus, the processor 180 may generate the set of the 2D image and the 3D head pose information with respect to the head of the same person at the same time.

The processor 180 may extract 3D head pose information for determining a rotation direction of the head from the 3D head pose information (S504).

The processor 180 may extract the 2D image matched with the extracted 3D head pose information (S505).

The processor 180 may extract head pose information that is obviously classified depending on a specific rotation direction of the head of the person and may select a 2D image matched with the extracted head pose information to select a 2D image appropriate for learning data.

For example, the processor 180 may classify the rotation direction of the head into upper, lower, left, right, upper-left, upper-right, lower-left, lower-right, and front directions, and may set a head direction reference value (a roll value, a pitch value, and a yaw value) that is classified from each rotation direction.

The processor 180 may compare at least one of the roll value, the pitch value, and the yaw value of the 3D head pose information with the head direction reference value and may determine a rotation direction of the head.

The processor 180 may extract the 3D head pose information for determining the rotation direction of the head.

The 2D image matched with the extracted 3D head pose information may be extracted.

The processor 180 may acquire 3D relative coordinates as a reference for correcting the 3D head pose information based on the 2D coordinates with respect to a predetermined landmark point of the extracted 2D image (S506).

For example, even if the head of the same person at the same time is photographed, the 2D image sensor and the 3D image sensor perform photography using different coordinate systems in different spaces, and thus, 3D coordinate information of the 3D coordinate information that needs to be derived from the 2D image and 3D coordinate information of the 3D head pose information acquired from the 3D image sensor may not be matched. In this case, the 3D coordinate information of the 3D head pose information may be information acquired from a head mounted marker (Hat) photographed by the 3D image sensor.

Thus, in order to acquire the 3D head pose information to be derived from the 2D image, it may be required to correct the 3D head pose information acquired from the 3D image sensor.

In order to acquire the 3D head pose information to be derived from a predetermined landmark point of the 2D image, the processor 180 may use 3D relative coordinates.

The 3D relative coordinates may be coordinates for determining a correlation between the 3D head pose information acquired from the 3D image sensor and the 3D head pose information to be derived from a predetermined landmark point of the 2D image.

The processor 180 may select a plurality of 2D images of the 2D image matched with the 3D head pose for determining the rotation direction of the head. For example, a 2D image classified as a left direction and a 2D image classified as a right direction may be selected.

The processor 180 may acquire 3D relative coordinates based on 2D coordinate information with respect to a predetermined landmark point of each of the plurality of selected 2D images.

The 3D relative coordinates (Fx, Fy, Fz) may be acquired according to the following equation.

2D ICS(image coordinate system)points=Intrinsic parameter*Extrinsic parameter*3D WCS(world coordinate system)     [Equation 1]

The '2D ICS points' may refer to 2D coordinates [Ix, Iy] of a predetermined point of a 2D image.

The 'Intrinsic parameter' may refer to a camera intrinsic parameter.

The 'Extrinsic parameter' may refer to a camera external camera (rotation and translation).

The '3D WCS' may refer to 3D coordinates [Wx, Wy, Wz] on a world coordinate system and may be represented by 'Transform of Hat*3D points of homogeneous coordinate'. The 'Transform of Hat' may be a value [R, T] (rotation and translation) for converting a coordinate system of the 3D image sensor into a world coordinate system. The '3D points of homogeneous coordinate' may be 3D relative coordinates [Fx, Fy, Fz] of a homogeneous coordinate system. Thus, predetermined coordinates [Ix, Iy] of the 2D image may be represented according to the following equation.

[Ix,Iy]=FT*[Fx,Fy,Fz]FT=[Intrinsic parameter]*[Extrinsic parameter]*[Hat transform]     [Equation 2]

The processor 180 may insert coordinates [Ix1, Iy1] of a predetermined point of a 2D image classified as a left direction and coordinates [Ix2, Iy2] of a predetermined point of a 2D image classified as a right direction into Equation 2 above and may calculate simultaneous equations to acquire 3D relative coordinates [Fx, Fy, Fz].

The processor 180 may correct the 3D head pose information based on the 3D relative coordinate and may acquire the corrected 3D head pose information of the predetermined landmark point of each 2D image (S507)

Thus, the processor 180 may acquire 3D head pose information to be derived from the 2D image and acquire the seat of the 2D image and the 3D head pose information to be derived from the 2D image with respect to the head of the same person at the same time.

The learning processor 130 may label each 2D image with the corrected 3D head pose information and may generate learning data (S508).

The learning processor 130 may label each 2D image with the corrected 3D head pose information with respect to a predetermined landmark point and may generate learning data.

The learning processor 130 may train a 3D head pose reasoning model using learning data (S509).

The 3D head pose reasoning model may be an artificial neural network (ANN) model used in machine learning. The 3D head pose reasoning model may include artificial neurons (nodes) that form a network by coupling synapse. An image recognition model may be defined by connection patterns between neurons between different layers, a learning procedure for updating a model parameter, and an activation function for generating an output value.

The 3D head pose reasoning model may include an input layer, an output layer, and one or more selected hidden layers. Each layer may include one or more neurons, and the artificial neural network may include synapse for connecting neurons. In the artificial neural network, each neuron may output input signals input through synapse, a weight, and a function value of an activation function for bias.

When the 3D head pose reasoning model is generated through supervised learning, learning may be performed in a state in which a label for learning data is given. The label may refer to an answer (or a result value) that needs to be inferred by an artificial neural network when learning data is input to the artificial neural network.

Thus, the learning processor 130 may label each received 2D image with the 3D head pose information that needs to be derived from the 2D image and may train the 3D head pose reasoning model to output the 3D head pose information from the 2D image.

Thus, when receiving a new 2D image, a dimensional head pose reasoning model may output head pose information including 3D position information and 3D rotation information of a head included in the 2D image.

The processor 180 may input a 2D head image of a head of a user to the 3D head pose information reasoning model and may acquire 3D head pose information of a 2D head image output from the 3D head pose reasoning model.

The processor 180 may acquire a head position and a head direction of the user based on the 3D head pose information of the 2D head image.

Figure 12:
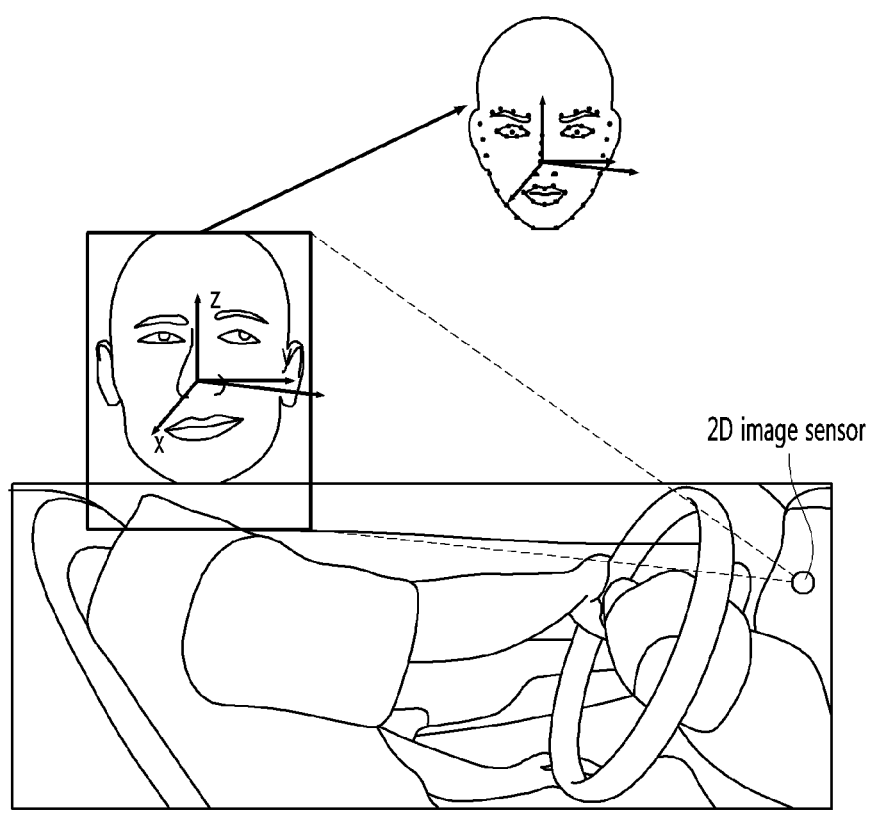
FIG. 12 is a diagram for explaining a procedure of recognizing a pose of a head of a driver according to an embodiment of the present disclosure.

For example, referring to FIG. 12, when the user drives a vehicle, the processor 180 may acquire an image of the head of the user through a 3D head pose information installed in a driver seat of the vehicle and may acquire 3D head pose information of the 2D head image using the 3D head pose reasoning model.

The processor 180 may acquire the head position and the head direction of the user based on 3D position information and 3D rotation information included in the 3D head pose information.

The processor 180 may determine whether the user safely drives the vehicle based on the head position and the head direction of the user.

The processor 180 may acquire an image of the head of the user through the 2D image sensor installed in the TV and may acquire 3D head pose information of the 2D head image using the 3D head pose reasoning model.

When the user moves the head in order to manipulate a TV, the processor 180 may perform an operation of the TV, corresponding to the movement of the head, based on the head position and the head direction of the user.

According to various embodiments of the present disclosure, 3D head pose information may be recognized from a 2D image of a head of a person.

According to various embodiments of the present disclosure, a 3D head pose reasoning model for inferring 3D head pose information from a 2D image may be trained.

According to various embodiments of the present disclosure, learning data for training the 3D head pose reasoning model may be corrected and the 3D head pose reasoning model may be trained based on the accurate learning data.

According to various embodiments of the present disclosure, head pose information of a person may be acquired using a 2D camera but not an expensive 3D camera.

According to various embodiments of the present disclosure, when a user moves his or her head to manipulate a device, the position or direction of the head of the user may be recognized from the 2D image of the user.

In addition, according to various embodiments of the present disclosure, the position or direction of a head of a direction may be recognized from a 2D image of the driver, thereby preventing drowsiness or forward-looking neglect.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the artificial intelligence apparatus.

What is claimed is:

1. An artificial intelligence (AI) apparatus comprising:
   an illuminant and a light source each respectively configured to emit light for a preset time period, wherein the preset time period occurs periodically;
   a two-dimensional (2D) image sensor configured to capture a 2D image of a head of a person and;
   a three-dimensional (3D) image sensor configured to capture 3D image information of the head of the person, wherein the 3D image information corresponds to at least one of 3D coordinate information, or 3D rotation information; and
   a processor configured to:
   associate the captured 2D image with the captured 3D image information corresponding to the captured 2D image by associating frame information of the captured 2D image with frame information of the captured 3D image information based on the captured images of the light source;
   select 3D head pose information for determining a rotation direction of the head from the captured 3D image information;
   select a 2D image associated with the selected 3D head pose information;
   determine 3D relative coordinates as a reference for correcting the selected 3D head pose information based on 2D coordinates with respect to a predetermined landmark point of the selected 2D image, wherein the 3D relative coordinates correspond to coordinates for determining a correlation between the captured 3D image information and a corrected 3D head pose information; and
   correct the captured 3D image information based on the determined 3D relative coordinates, wherein
   the corrected captured 3D image information is determined based on a particular predetermined landmark point of each 2D image.

2. The AI apparatus of claim 1, wherein the processor is further configured to detect a landmark point of the head from the captured 2D image, wherein the landmark point corresponds to a feature point for recognizing a head position and a head direction.

3. The AI apparatus of claim 1, wherein the frame information of the captured 2D image and the frame information of the captured 3D image information are associated by associating a plurality of frames of the captured 3D image information with at least one frame of captured pluralities of 2D images based on a frame per second of the 2D image sensor being lower than a frame per second of the 3D image sensor, and associating a plurality of frames of the captured 2D image with at least one frame of the captured 3D image information based on the frame per second of the 2D image sensor being higher than the frame per second of the 3D image sensor.

4. The AI apparatus of claim 1, wherein the processor is further configured to:
   synchronize a 2D timestamp of the 2D image sensor with a 3D timestamp of the 3D image sensor by storing a timestamp when a photography start signal is input as metadata of the 2D image, and associating the 3D image information having a same timestamp as a stored timestamp included in metadata of the 2D image with the 2D image.

5. The AI apparatus of claim 1, wherein the 3D image information includes head rotation information including at least a roll value, a pitch value, or a yaw value of the head, and wherein the 3D head pose information for determining a rotation direction of the head from the captured 3D image information is selected based at least in part on comparing at least one of the roll value, the pitch value, or the yaw value of the captured 3D image information with a head direction reference value.

6. The AI apparatus of claim 1, wherein the 3D relative coordinates are determined based at least in part by selecting a plurality of 2D images associated with the selected 3D head pose information and on 2D coordinate information with respect to a specific predetermined landmark point of each of the selected plurality of 2D images.

7. The AI apparatus of claim 1, further comprising:
   a learning processor configured to generate learning data by labeling each 2D image with the corrected captured 3D image information with respect to the predetermined landmark point of the selected 2D image, and to train a 3D head pose reasoning model for inferring a particular 3D head pose information from a predefined 2D image using the generated learning data, wherein the 3D head pose reasoning model corresponds to a neural network model.

8. The AI apparatus of claim 7, wherein the processor is further configured to:
   input a 2D head image of the head of a user to the trained 3D head pose information reasoning model for determining the particular 3D head pose information of the inputted 2D head image, and
   determine a head position and a head direction of the user based on the determined particular 3D head pose information of the inputted 2D head image.

9. A method of estimating a head pose, the method comprising:
   emitting, by both an illuminant and a light source, light for a preset time period, wherein the preset time period occurs periodically;
   capturing, by a two-dimensional (2D) image sensor, a 2D image of a head of a person;
   capturing, by a three-dimensional (3D) image sensor, a 3D image information of the head;
   associating the captured 2D image with the captured 3D image information corresponding to the captured 2D image by associating frame information of the captured 2D image with frame information of the captured 3D image information based on the images of the light source;
   selecting 3D head pose information for determining a rotation direction of the head from the captured 3D image information;
   selecting a 2D image associated with the selected 3D head pose information;
   determining 3D relative coordinates as a reference for correcting the selected 3D head pose information based on 2D coordinates with respect to a predetermined landmark point of the selected 2D image; and
   correcting the captured 3D image information based on the determined 3D relative coordinates,
   wherein the corrected captured 3D image information is determined based on a particular predetermined landmark point of each 2D image.

10. The method of claim 9, further comprising detecting a landmark point of the head from the captured 2D image, wherein the landmark point corresponds to a feature point for recognizing a head position and a head direction.

11. The method of claim 9, wherein the frame information of the captured 2D image and the frame information of the captured 3D image information are associated by associating a plurality of frames of the captured 3D image information with at least one frame of captured pluralities of 2D images based on a frame per second of the 2D image sensor being lower than a frame per second of the 3D image sensor, and associating a plurality of frames of the captured 2D image with at least one frame of the captured 3D image information based on the frame per second of the 2D image sensor being higher than the frame per second of the 3D image sensor.

12. The method of claim 9, further comprising:
synchronizing a 2D timestamp of the 2D image sensor with a 3D timestamp of the 3D image sensor by storing a timestamp when a photography start signal is input as metadata of the 2D image and associating the 3D image information having a same timestamp as a stored timestamp included in metadata of the 2D image with the 2D image.

13. The method of claim 9, wherein the 3D image information includes head rotation information including at least a roll value, a pitch value, or a yaw value of the head; and
wherein the 3D head pose information for determining a rotation direction of the head from the captured 3D image information is selected based at least in part on comparing the rotation direction of the head by comparing at least one of the roll value, the pitch value, or the yaw value of the captured 3D image information with a head direction reference value.

14. The method of claim 9, wherein the 3D relative coordinates are determined based at least in part by selecting a plurality of 2D images associated with the selected 3D head pose information, and on information on 2D coordinates with respect to a specific predetermined landmark point of each of the plurality of selected 2D images.

15. The method of claim 9, further comprising:
generating learning data by labeling each 2D image with the corrected captured 3D image information with respect to the predetermined landmark point of the selected 2D image; and
training a 3D head pose reasoning model for inferring a particular 3D head pose information from a predefined 2D image using the generated learning data, wherein the 3D head pose reasoning model corresponds to a neural network model.

16. The method of claim 15, further comprising:
inputting a 2D head image of the head of a user to the trained 3D head pose information reasoning model for determining the particular 3D head pose information of the inputted 2D head image; and
determining a head position and a head direction of the user based on the determined particular 3D head pose information of the inputted 2D head image.

* * * * *